C. D. BRANDT.
PUMP PISTON.
APPLICATION FILED SEPT. 23, 1919.

1,338,765.  Patented May 4, 1920.

WITNESSES

INVENTOR
Charles D. Brandt
BY
ATTORNEYS

UNITED STATES PATENT OFFICE.

CHARLES D. BRANDT, OF NEW YORK, N. Y., ASSIGNOR OF ONE-HALF TO EUGENE J. SCHWEIZER, OF RIDGEWOOD, NEW YORK.

PUMP-PISTON.

1,338,765.          Specification of Letters Patent.      Patented May 4, 1920.

Application filed September 23, 1919. Serial No. 325,606.

*To all whom it may concern:*

Be it known that I, CHARLES D. BRANDT, a citizen of the United States, and resident of Richmond Hill, Long Island, borough and county of Queens, city and State of New York, have invented certain new and useful Improvements in Pump-Pistons, of which the following is a specification.

My invention relates to pump pistons and has for its object to provide a simplified and efficient construction in which the piston elements are connected with the piston rod in a novel manner and so as to facilitate the assembling and disassembling thereof. Other more specific objects will appear from the description hereinafter and the features of novelty will be pointed out in the appended claims.

Figure 1:
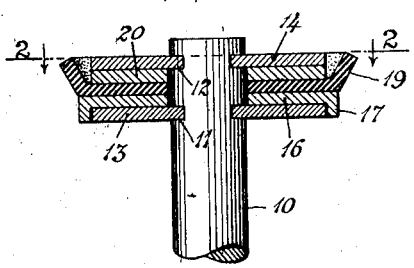
Figure 2:
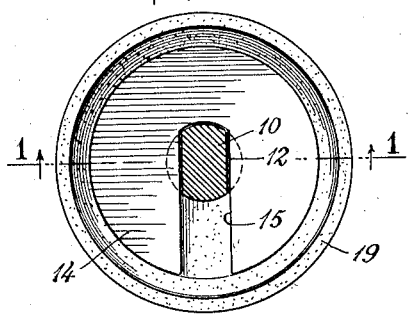

In the accompanying drawings, which for illustrative and descriptive purposes show a specific embodiment of my invention, Figure 1 is a vertical section of the piston on the line 1—1 of Fig. 2;

Fig. 2 is a horizontal section on the line 2—2 of Fig. 1;

And Figs. 3, 4, 5 and 6 are plan views of the various elements comprising the piston.

Figure 3:
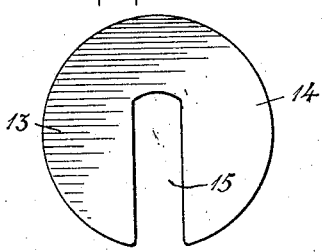
Figure 4:
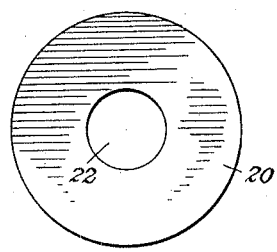
Figure 5:
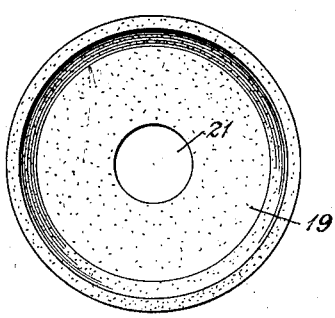
Figure 6:
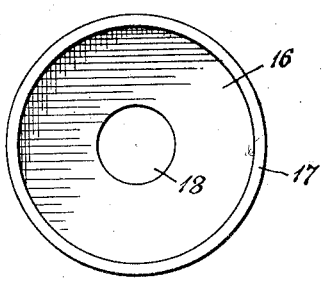

As shown in the illustrated example, the piston rod 10 which may be of any suitable construction is provided near its one end with two sets of grooves 11 and 12 arranged in parallel pairs extending transversely across the rod 10 as shown in Fig. 2. The piston itself comprises a pair of duplicate disks 13 and 14 of suitable material preferably metal, and each provided with a diametrical slot 15 having its outer end open and interrupting the periphery of the disks as shown in Fig. 3. The piston further consists of a cap 16 of suitable material and having a peripheral flange 17 and a central opening 18 the internal diameter of said flange 17 being such as to fit over the disk 13 as will be more fully explained hereinafter, while the opening 18 is of a size to readily fit over the piston rod 10. In addition the piston includes a cupped plunger 19 of leather or other suitable material and washer 20, the plunger 19 and the washer 20 having central apertures 21 and 22 respectively adapted to fit over said piston rod 10.

In assembling the parts the disk 13 is inserted into the groove 11 by a movement transverse to the axis of said piston rod, the slot 15 passing over the reduced portion of the rod 10 at this point as shown in Fig. 1. The cap 16 is then placed upon the piston rod 10 and moved lengthwise thereof until the flange 17 fits over the disk 13 and incloses same, thereby fixing said disk 13 in position and preventing any material movement thereof in directions transverse to the axis of the rod 10. The plunger 19 is next placed upon the rod 10 so as to face toward the free end of the piston 10 and is moved lengthwise of the latter until it rests against the cap 16 after which the washer 20 is slipped over the rod 10 into the plunger 19 as shown in Fig. 1. The assembling is completed by inserting the disk 14 into the groove 12 by a movement transverse to the axis of the rod 10, the slot 15 passing over the reduced portion of the latter at this point. The plunger 19 may be temporarily flattened out to facilitate the connection of the disk 14 with the rod 10 as described. In its normal operative condition the peripheral flange of the plunger 19 prevents any material movement of said disk 14 transverse to said rod 10 and whereby said disk might become unintentionally disconnected therefrom.

The elements are so dimensioned and the grooves 11 and 12 are so located that the cap 16, plunger 19 and washer 20 will be firmly clamped between the two disks 13 and 14 in the fully assembled condition of the piston. The disks 13 and 14 are preferably constructed so as to frictionally engage the walls of the grooves 11 and 12 thus still further increasing the locking action of said disks.

The arrangement is extremely simple in construction and efficient in operation and furthermore avoids the necessity for screw-threading and reducing the end of the piston rod and in fact obviates the use of fastening devices of any kind such as nuts and the like which in the operation of the piston, are likely to become loosened and thus destroying or reducing the efficiency thereof. The assembling and disassembling of the piston is also greatly facilitated thus making it a simple matter to replace parts which may have become worn and useless.

It will be understood that the grooves 11 and 12 whereby the disks 13 and 14 are connected with the piston rod 10 may be replaced by equivalent devices and that said grooves, in the particular form illustrated are only examples selected for the purpose of illustration and description.

Various changes in the specific form shown and described may be made within the scope of the claims without departing from the spirit of my invention.

I claim:

1. A pump piston comprising a piston rod, a plunger carried thereby, clamping means on said rod between which said plunger is clamped, said means including devices connected with said rod by a movement transverse to its axis and means on said rod coöperating with said devices to secure said clamping means upon said rod.

2. A pump piston comprising a piston rod, a plunger carried thereby, clamping means on said rod between which said plunger is clamped, said means including slotted disks connected with said rod by movements transverse to its axis and means on said rod coöperating with said disks to secure said clamping devices upon said rod.

3. A pump piston comprising a piston rod provided with grooves spaced from each other in an axial direction, a plunger carried thereby, and clamping means on said rod between which said plunger is clamped, said means including disks having open ended slots and fitted into said grooves by movements transverse to the axis of the rod.

4. A pump piston comprising a piston rod provided with transverse grooves arranged in pairs spaced from each other lengthwise of said rod, a slotted disk fitted into one pair of grooves by a movement transverse to the axis of the rod, a cap on said rod fitted over said disk and maintaining it against transverse movement relatively to the rod, a plunger on said rod in surface engagement with said cap, a washer on said rod located within said plunger and a second slotted disk fitted into the other pair of grooves by a movement transverse to the axis of the rod and engaging said washer, whereby said cap, plunger and washer are clamped between said disks.

In testimony whereof I have hereunto set my hand.

CHARLES D. BRANDT.